United States Patent [19]

Moon et al.

[11] Patent Number: 5,241,549

[45] Date of Patent: Aug. 31, 1993

[54] DATA COMMUNICATIONS SYSTEM

[76] Inventors: Anthony G. Moon, 22 Greenacres, South Cornelly, Bridgend, Mid-Glamorgan, Wales, CF33 4SE; Alec D. Knowles, 7 Collins Street, Neath, West Glamorgan, Wales, SA11 2HH

[21] Appl. No.: 420,353

[22] Filed: Oct. 12, 1989

[30] Foreign Application Priority Data

Oct. 15, 1988 [GB] United Kingdom ............... 8824205

[51] Int. Cl.$^5$ .............................. H04L 1/08
[52] U.S. Cl. .......................... 371/70; 371/69.1
[58] Field of Search ................. 371/70, 69.1, 71

[56] References Cited

U.S. PATENT DOCUMENTS

| | | | |
|---|---|---|---|
| 3,427,585 | 2/1969 | Milford | 371/70 |
| 3,449,717 | 6/1969 | Smith et al. | 371/70 |
| 3,624,603 | 11/1971 | Delcomyn | 371/70 |
| 3,737,577 | 6/1973 | Birkin | 371/69.1 |
| 3,978,449 | 8/1976 | Sanders et al. | 371/70 |
| 4,045,771 | 8/1977 | Loreck | 371/70 |
| 4,599,723 | 7/1986 | Eck | 371/70 |
| 4,621,368 | 11/1986 | Onoe et al. | 371/69.1 |
| 4,860,286 | 8/1989 | Forsberg et al. | 371/70 |

FOREIGN PATENT DOCUMENTS

| | | | |
|---|---|---|---|
| 0094253 | 6/1983 | Japan | 371/70 |
| 1374228 | 11/1974 | United Kingdom . | |

*Primary Examiner*—Robert W. Beausoliel
*Assistant Examiner*—Allen M. Lo
*Attorney, Agent, or Firm*—Gunn, Lee & Miller

[57] ABSTRACT

A train of signals is generated by clocking an 8-bit word from an 8-bit shift register which has been loaded with an initial data word. The register is provided with feedback loop. The serial data is supplied along a communication link to a similar or identical 8-bit shift register at the receiving end of the link. A comparator compares the output data of the register with the first stage of the register and provides an accept signal provided such comparison indicates inversions at the receipt of each bit for 9-bits onwards. After transmission of 24-bits, the shift register contains the 8-bit data word, which has been checked twice for any inaccuracy.

4 Claims, 2 Drawing Sheets

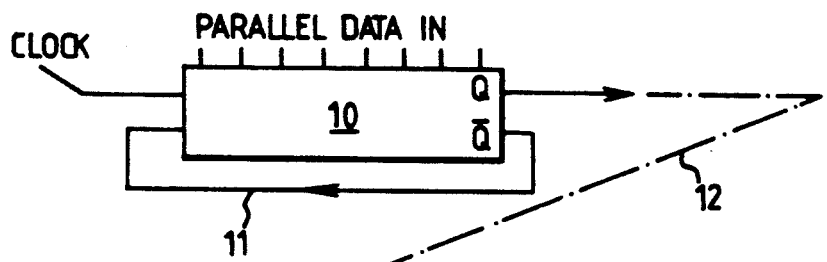
FIG.1
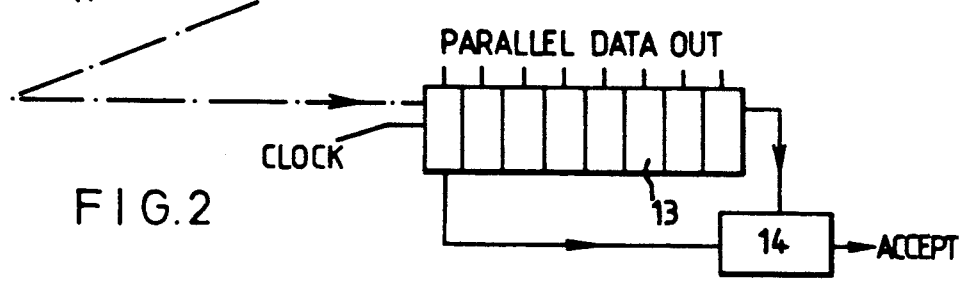
FIG.2
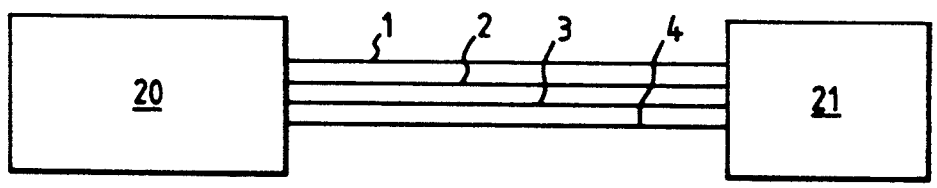
FIG.3
H L (8-bit data) (8-bit data inverse) (8-bit data) L H H H H H
start                                              end
bits                                               bits
FIG.4

DATA COMMUNICATIONS SYSTEM

BACKGROUND OF THE INVENTION

The invention relates to data communication systems. More particularly the invention relates to systems for the communication of serial data.

As the application of electronic control systems becomes more widespread and complex, the need for data to be sent about such systems with high reliability has become an important factor. To minimize the complexity and cost of communication links, multiplexed or serial communication systems are used. However, it is necessary that the circuitry communicating upon a serial link be as simple and hence as cost-effective as possible while being very reliable. Coding systems currently used are generally either not reliable enough or far too complicated and would take up a lot of space within a device. An example of the latter case is that of cyclic redundancy coding (CRC) where large check words are generated and sent along with the data word. The generation of such a coding sequence requires extensive shift register networks to implement coding polynomials and with increasing use of ASIC technology such large coding systems are expensive.

European Patent Specification EP0013103 describes a system that splits up a message into two components, an address part and a data part. For error checking, these two components may be seen as two separate blocks, each block having its own error check. The block is received by clocking it into a shift register. It is then transferred to an intermediate register. The inverse of the block is then received in the original shift register. Each bit is compared with its inverse after receipt, i.e., the word in the shift register is compared with the word in the intermediate register for the inverse relationship.

United Kingdom Patent Specification GB1374228 discloses the use of a long shift register in which is stored both the true message and its inverse. Only after the full message has been received are the stages of the shift register containing corresponding bits of the true and inverse parts of the message compared. An error signal is provided if the correct relationship does not exist for all the comparisons.

Further, another United Kingdom Patent Specification GB2144606B describes sending data as pairs of bits, a true bit and a complement bit. This is used to remove any dc component from the resulting signal. The method of error detection requires receiving a complete message and then performing the error check.

An object of the invention is to provide a system for serial data transmission which is reliable and uncomplicated.

According to one aspect of the invention there is provided a method of verifying the accurate transmission of an n-bit word comprising transmitting the n-bit word followed by transmitting an inversion of the n-bit word, receiving the words in an n-bit shift register and checking for inversion of the n+ bit and all subsequent bits up to n+n bits by synchronized comparison with the corresponding output of the shift register, and providing an accept signal only if all the compared bits are inversions of one another; the word then stored in the shift register being the accurate inversion of the n-bit word.

The method may comprise sending the n-bit word again after transmitting the inverted n-bit word in which case the checking for inversion is carried out for n+1 to n+2n bits, in which case the word then stored in the shift register is the n-bit word and not its inversion; the checking having been carried out twice.

In a similar manner the transmitting method may include transmitting the n-bit word several times an alternatively sending the inversion of the word so that the checking is carried out three or more times respectively.

According to another aspect of the invention there is provided an apparatus for checking the accuracy of serially transmitted data, the apparatus including a transmitter for sending the n-bit words of data and an inversion of the n-bit words alternatively, an n-bit shift register for receiving the data, means for comparing the first stage of the register with its output arranged to provide a accept signal if that stage and the output are inversions of one another for all the data received after the first nth bit.

SUMMARY OF THE INVENTION

In the present invention messages or parts or words of such messages are checked by sending the words and generating the inverse of those words for error checking. Error checking is carried out as the message is received; thus removing the need to store simultaneously the message and its inverse. The present invention carries out what may be described as "dynamic" error checking. The inherent reduction in storage capacity required reduces the size of the circuitry, normally silicon chips, and hence the cost without compromising the integrity of the error checking. Normally only one comparator is used for checking, no matter how long the overall message is, by checking the message bit by bit, e.g., using 8-bit words.

In the present invention a train of signals is generated by clocking an 8-bit word from an 8-bit shift register which has been loaded with an initial data word. The register is provided with feed-back loop. The serial data is supplied along a communication link to a similar or identical 8-bit shift register at the receiving end of the link. A comparator compares the output data of the register with the first stage of the register and provides an accept signal only if the comparison indicates inversions at the receipt of each bit for 9-bits onwards. After transmission of 24-bits, the shift register contains the 8-bit data word, which has been checked twice for any inaccuracy.

BRIEF DESCRIPTION OF THE DRAWINGS

A data transmission system according to the invention will now be described by way of example with reference to the accompanying schematic drawings in which:

FIG. 1 illustrates a code sequence of a train of signals of the present invention.

FIG. 2 illustrates a block diagram of a portion of the transmission and receiving end of the system of the present invention.

FIG. 3 illustrates a block diagram of the layout of the system of the present invention.

FIG. 4 illustrates a typical signal code sequence used in practice.

DETAILED DESCRIPTION OF THE PREFERRED EMBODIMENT

Figure 5:
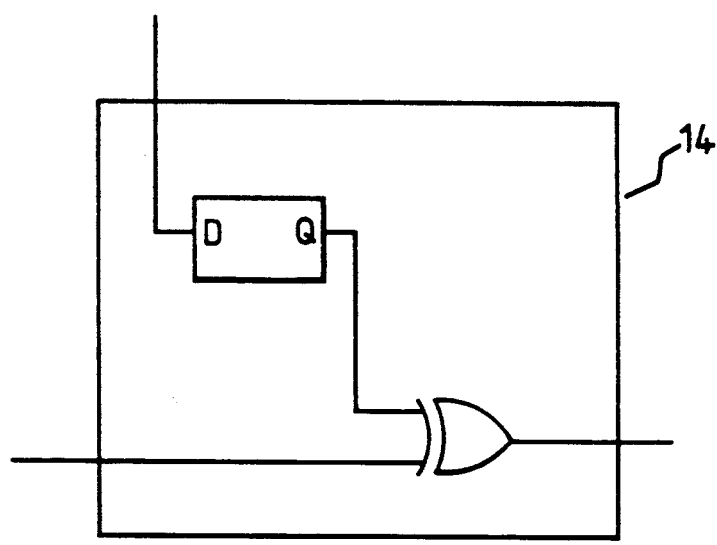
FIG. 5 shows a comparator of the system of FIG. 2.

Referring to the drawings, the data to be communicated along a communication link each comprise data words of 8-bits. For each transmission, a train of signals comprises in sequence the required 8-bit data word, its inversion and the word again, as shown in FIG. 1.

A train of signals is generated by clocking an 8-bit word from an 8-bit shift register 10 which has been loaded with the initial data word. The register 10 is provided with feed-back loop 11 as shown in FIG. 2. The serial data is supplied along a communication link 12 to a similar or identical 8-bit shift register 13 at the receiving end of the link 12. A comparator 14 is arranged to compare the output data of the register 13 with the first stage of the register 13 and to provide an accept signal provided such comparison indicates inversions at the receipt of each bit for 9 bits onward. After transmission of 24 bits, the shift register 13 contains the 8-bit data word, which has been checked twice for any inaccuracy generally resulting from the transmission problems.

In a practical situation as shown in FIG. 3, a microcontroller 20 is used in a vehicle for use in controlling a number of remote systems 21, only one of which is shown. The microcontroller 20 is used to communicate with remote systems located within seats and doors for example of the vehicle and each remote controller is connected to the microcontroller 20 by four wire links.

Link 1 is a bi-directional data link along which the 8-bit words are transmitted. Link 2 carries clocking signals generated at the microcontroller 20 for the remote systems 21 to maintain synchronized operation. Link 3 is used for directional instructions to control which of the circuits transmit the data and which receive the data at any time. Link 4 is a logical zero or earth link to provide a controlled reference for the system.

A typical signal is shown in FIG. 4. The data is 8-bits long and is framed in a high-low start and low-high end sequence. This constitutes a 28-bit stream and the direction is changed every 32 clock pulses. Thus, after each low-high stop bit, high states are sent until the next direction change. The start and stop sequences are monitored as well as the nature of the received "tricyclic" data bits and any errors detected by the comparator 14. When the direction signal changes state, the received data then in the shift register 13 is accepted only if no errors have been detected by the comparator 14.

The described arrangement carries out transmission error checking with a minimum of components. It will be further noted that the shift registers 10 and 13 can be and are both used for transmitting and receiving signals. Each data bit is checked as it is received (in the described system this is carried out twice for each bit of the data) using relatively simple and otherwise well-tried and reliable shift-register components.

The data can be sent repeatedly and there is no facility provided or required for implementing data correction, again keeping the system extremely simple. Any temporary interference or fault in the transmission link can be ignored, because the data is repeatedly sent as described until a complete sequence without an error is satisfactorily received.

It will be noted that the described error checking is carried out using a single shift register in a manner which may be described as "dynamic" error checking. In other words there is no need to store the words or the inverses thereof for comparison, as is required in prior art arrangements.

The shift register may be shorter than the total message so that if the total message is n bits long repeated m times, the shift register need only be n bits long and is then clocked n×m times. In the prior art the two or more shift registers required must store the whole message, that is they must each be m×n bits long.

While the invention has been described in connection with a preferred embodiment, it is not intended to limit the invention to the particular form set forth, but, on the contrary, it is intended to cover alternatives, modifications, and equivalents, as may be included within the spirit and scope of the invention as defined by the appended claims.

We claim:

1. Apparatus for checking the accuracy of serial transmitted data, comprising;
   a transmitter for sending serially n-bit words of data and an inversion of said n-bit words alternately;
   an n-bit shift register for receiving said data;
   one bit delay means for receiving a bit output by said shift register; and
   means for comparing each received bit after it has been latched into a first stage of said shift register and before it has been latched into a second stage of said shift register with an output of said one bit delay means, said means for comparing providing an accept signal if said each received bit and said output of said one bit delay means are inversions of one another for all said received data received after a first n-bit word.

2. A method of verifying the accurate transmission of an n-bit word, comprising the steps of:
   firstly serially transmitting said n-bit word, as 1 up to n bits;
   second serially transmitting of an inversion of said n-bit word, as n+1 up to n+n bits;
   serially receiving said bits in an n-bit shift register;
   serially receiving bits which are shifted from the nth stage of said shift register in a one bit delay element;
   comparing each bit of said inverted n-bit word after it has been latched into a first stage of the shift register and before it has been latched into a second stage of the shift register, with a bit which is available on an output of said one bit delay element;
   and providing an accept signal only if all compared bits are inversions of one another, the word then stored in said shift register being the accurate inversion of said n-bit word.

3. A method of verifying the accurate transmission of an n-bit word according to claim 2, further comprising sending the n-bit word again after transmitting the inversion of the n-bit word, whereby the checking for inversion is carried out for n+1 to n+2n bits, and the word then stored in the shift register is the word and not its inversion, the checking having been carried out twice.

4. A method of verifying the accurate transmission of an n-bit word according to claim 2, further comprising alternately transmitting the n-bit word and the inversion of the word a multiplicity of times so that the checking is carried out three or more times.

* * * * *